US006567963B1

(12) United States Patent
Trezza

(10) Patent No.: US 6,567,963 B1
(45) Date of Patent: May 20, 2003

(54) WAFER SCALE INTEGRATION AND REMOTED SUBSYSTEMS USING OPTO-ELECTRONIC TRANSCEIVERS

(75) Inventor: John A. Trezza, Nashua, NH (US)

(73) Assignee: Tera Connect, Inc., Nashua, NH (US)

( * ) Notice: Subject to any disclaimer, the term of this patent is extended or adjusted under 35 U.S.C. 154(b) by 145 days.

(21) Appl. No.: 09/693,664

(22) Filed: Oct. 20, 2000

Related U.S. Application Data

(63) Continuation-in-part of application No. 09/653,727, filed on Sep. 1, 2000.
(60) Provisional application No. 60/165,562, filed on Nov. 15, 1999, and provisional application No. 60/161,170, filed on Oct. 22, 1999.

(51) Int. Cl.[7] .................................................. G06F 9/45
(52) U.S. Cl. ...................... 716/8; 761/8; 761/9; 761/10
(58) Field of Search ..................... 716/8, 9, 10; 257/82, 257/83, 185; 359/163, 622; 710/14

(56) References Cited

U.S. PATENT DOCUMENTS

| 4,422,088 A | 12/1983 | Gfeller |
| 4,966,430 A | 10/1990 | Weidel |
| 4,989,935 A | 2/1991 | Stein |
| 5,009,476 A | 4/1991 | Reid et al. |
| 5,200,631 A | 4/1993 | Austin et al. |
| 5,241,610 A | 8/1993 | Labiche et al. |
| 5,289,303 A | 2/1994 | Cloonan et al. |
| 5,313,536 A | 5/1994 | Rossi et al. |
| 5,324,932 A | 6/1994 | Niewisch |
| 5,333,225 A | 7/1994 | Jacobowitz et al. |
| 5,420,954 A | 5/1995 | Swirhun et al. |
| 5,428,704 A | 6/1995 | Lebby et al. |
| 5,469,526 A | 11/1995 | Rawlings |
| 5,472,914 A | 12/1995 | Martin et al. |
| 5,506,383 A | 4/1996 | Chen |
| 5,533,158 A | 7/1996 | Han et al. |
| 5,535,036 A | 7/1996 | Grant |
| 5,568,574 A | 10/1996 | Tanguay, Jr. et al. |
| 5,579,426 A | 11/1996 | Li et al. |
| 5,667,132 A | 9/1997 | Chirovsky et al. |

(List continued on next page.)

OTHER PUBLICATIONS

M. Ajmone Marsan et al, Modelling Slotted Multi–Channel Ring All–Optical Networks, *IEEE*, 1997, pp. 146–153.
Marco Ajmone Marsan et al, Access Protocols fopr Photonic WDM Multi–Rings with Tunable Transmitters and Fixed Receivers, *SPIE*, pp. 59–72, vol. 26921.
Carl Beckmann, Applications: Asynchronous Transfer Mode and Synchronous Optical Network, *Handbook of Fiber Optic Data Communication*, 1998, pp. 385–414, Academic Press.
Floyd E. Ross, An Overview of FDDI: The Fiber Distributed Data Interface, *IEEE Journal on Selected Areas in Communications*, Sep. 1989, pp. 1043–1051, vol. 7 No. 7.
PCT International Search Report dated Mar. 30, 2001 of International Application No. PCT/US00/41388 filed Oct. 20, 2000.

Primary Examiner—Vuthe Siek
Assistant Examiner—Binh Tat
(74) Attorney, Agent, or Firm—Maine & Asmus

(57) ABSTRACT

An apparatus and method for optically interconnecting subsystems of a microprocessor system, whether co-located on a common wafer or divided among two or more wafers or substrates. Photo- transceiver arrays adjacent all or selected subsystems are optically interconnected to other subsystems for data transfer, enabled by protocol embedded in the CMOS circuitry in the respective substrates, enabling high speed and large bandwidth communications. Subsystems on a wafer can be located at some distance apart and communicate via the optical interconnect without adverse propagation delays. In a preferred embodiment a central processing unit (CPU) interfaces optically with a plurality of remote memory or co-processor subsystems.

18 Claims, 7 Drawing Sheets

U.S. PATENT DOCUMENTS

| | | |
|---|---|---|
| 5,715,274 A | 2/1998 | Rostoker et al. |
| 5,761,350 A | 6/1998 | Koh |
| 5,805,548 A | 9/1998 | Ishihara |
| 5,818,984 A | 10/1998 | Ahmad et al. |
| 5,857,042 A | 1/1999 | Robertson et al. |
| 5,858,814 A | 1/1999 | Goossen et al. |
| 5,866,443 A | 2/1999 | Pogge et al. |
| 5,896,213 A | 4/1999 | Nagahori et al. |
| 5,909,303 A | 6/1999 | Trazza et al. |
| 5,923,796 A | 7/1999 | Feldman et al. |
| 5,951,627 A | 9/1999 | Kiamilev et al. |
| 5,987,196 A | 11/1999 | Noble |
| 6,147,366 A | 11/2000 | Drottar |

WAFER SCALE INTEGRATION AND REMOTED SUBSYSTEMS USING OPTO-ELECTRONIC TRANSCEIVERS

CROSS REFERENCE TO RELATED APPLICATIONS

This application claims priority to U.S. patent application Ser. No. 60/165,562 filed Nov. 15, 1999; Ser. No. 60/161,170, filed Oct. 22, 1999; and is a continuation-in-part of Ser. No. 09/653,727, filed Sep. 1, 2000, and which are all incorporated herein by reference for all purposes.

BACKGROUND OF THE INVENTION

1. Technical Field of the Invention

This invention most generally relates to data transfer and broadband communication networks within a parallel computing system or a local area network. In particular, the present invention relates to wafer scale integration of opto-electronics.

2. Background of the Invention

Technological advancements have dramatically increased the capabilities and possibilities of computing electronics. The increased bandwidth and data transfer rates have resulted in commercial innovation and scientific advancements in many fields. However, data transfer continues to be a bottleneck. This is true for data transfer within an integrated circuit (IC), from one chip to another, from hybrid circuit to hybrid circuit, from integrated circuit board to another integrated circuit board, and from system to system.

Another driving factor leading to ever increasing demands for faster data transfer rates is the need to do tasks that are more complex, requiring multiple computing nodes to cooperate. Digital signal processing, image analysis, and communications technology all require a greater bandwidth. The demand for increased data transfer capability and greater bandwidth translates into increases in both the speed of the data transfer, and the amount of data that is transferred per unit time.

In general, the problems associated with data transfer within an IC and on a system network are similar. Increasing the data transfer rate can be done in any of several ways. Some increase in the data transfer rate can be obtained by increasing the speed at which signals are communicated from one part of a system or network to another. Presently, the fastest known transfer means is the use of optical signals that operate at the speed of light.

Another means to reduce system delays is to increase the bandwidth being used. In this approach, more information is sent at one time. Since the vast majority of systems and networks now are digital, the measure of the increase in bandwidth is in terms of the number of bits on a bus.

There are limitations to the available bandwidth, such as spacing and size requirements, noise problems, reliability of connectors, processing times, buffer size, and the power required to drive multiple lines off-chip. Increasing the transmission speed also has some limitations, as increasing the speed also increases power requirements, introduces timing skew problems across a channel, and usually requires more exotic processing than is standard practice. Combining higher transmission speeds and more bandwidth is exceedingly difficult and impractical.

Whether transferring data within a circuit or connecting system to system, the limited bandwidth of conventional hardware does not satisfy the marketplace. For high data rate transmissions, only fiber optics transmit data at Gigabit data rates. Fiber optic communication systems allow information to be transmitted by means of binary digital transmission. The data or information that is to be transmitted is converted into a stream of light pulses, wherein the presence of a pulse corresponds to the transmission of a binary "one," and the absence of light corresponds to the transmission of a binary "zero." An optical receiver is used to convert the stream of light pulses into an electrical signal that is processed to determine the transmitted information.

Typically the optical transmitters are light emitting devices such as vertical cavity surface emitting lasers (VCSELS) and light detecting devices such as photodiodes. The optical transmitters and receivers may be encompassed in a separate chip or fabricated on the same substrate and with accompanying electronics. The fabrication process is well known in the art and U.S. Pat. No. 5,978,401 provides background materials, and is incorporated by reference.

The transmitters have driver circuitry that drives the VCSELS, while the receivers also have receiver circuitry for processing the received signals. The transmitter driver circuitry and the receiver driver circuitry is usually in the form of ASIC devices. The combination of the VCSELS and photodiodes along with the ASIC driver circuitry is called an optical transceiver. One embodiment for hybridization of the transceiver elements is via flip-chip bonding, which is generally explained in U.S. Pat. No. 5,858,814, incorporated by reference herein.

Optical fibers are used to transmit the optical data off the transceiver device and the fibers mate with the transceiver for data transfer. A spacing problem exists when there are large arrays of transceivers and corresponding optic cables mating to each emitter and detector. The coupling and alignment of these multiple fiber optic cables is exceedingly difficult and there is a high defect rate in large bundles.

In particular, data transfer in and out of a processor is a major concern. If the memory resides off the chip and is connected by traditional electronic means, data access is particularly slow. Even if it is on the chip, the current capabilities of reticles limit the amount of memory that is possible to put on the chip.

In recent years, there has been increased interest in systems on a chip. The logical extension of this idea is the system on a wafer, so called wafer scale integration. There are advantages to integrating an entire system on a wafer. First, the entire mask set can be designed for a particular function, much like current microprocessors, but at a higher level. Second, the entire wafer experiences the same set of process conditions. Many circuits exhibit slight process dependencies such as shifts in threshold voltages in MOSFETs and it is advantageous for all of the MOSFETs in a system to exhibit the same sensitivities. A further benefit of wafer scale integration is that all of the elements of a circuit can be processed at the same time.

However, with existing wafer fabrication technology there are some severe constraints posed by the need to have circuit elements such as memory, and some supporting circuitry, physically close to the processor section of a chip. The reason for this requirement is that as the distance between circuit elements increases, so does the signal propagation delays. The signal propagation increases the delay associated with transferring data to and from memory, and the need to accommodate current interconnection schemes. To account for the additional signal delay it becomes necessary to slow the data rate into and out of memory.

A prior art example of the spatial relationship between the processor section and the memory is shown in FIG. 1. The central processing unit (CPU) 10 is located in some small portion of the chip 30, while the memory cells 20 are located as near as possible in order to minimize distance and therein minimize propagation delays. It is apparent that only a certain quantity of memory devices may be located in close proximity to the CPU. Additional memory devices may be located at a greater distance on the chip or be located off chip. In either scenario, the increased distance translates into propagation delays.

An additional problem involved in wafer integration deals with the internal connections. The imaging process involved in forming integrated circuits must be done in a 'step and repeat' manner because of limitations in imaging extremely fine structures across a large area. In sum, there are challenges associated with reliably making connections from one portion of a wafer to another using conventional lithographic techniques if the distances are too great.

The factors that limit the transferal of data to and from processors on a wafer become even more acute as compared to system level impediments. Though transfer rates within a chip are quite high, the inter-chip data transfer rates are appreciably slower than the intra-chip data transfer rates. This problem is due, in part, to the limited area on the perimeter of integrated circuits, which traditionally contains the Input/Output (I/O) buffers needed to drive signals off-chip. Consequently, there is often a severe limitation on the number of bits available for any external bus. Thus, an external data bus can be a significant bottleneck to improving system performance. At present, the largest bus sizes are only 64 bits wide.

Some attempts have been made to address the aforementioned problems. Considerable work has been done to develop optical interconnect technology for mating transceivers with silicon die, but the current systems are still very limited in bandwidth.

In summary, conventional methods for communicating data between a CPU and memory cells on chips are slow and bandwidth limited. Furthermore, constraints of reticles limit the amount of memory that is possible to place next to a CPU.

In addition, traditional methods for assembling systems consist of producing individual chips that comprise a system, then packaging them, and shipping them to an assembly site where the chips are mounted on a motherboard. This process is inefficient because it requires excessive handling that increases costs and time. Furthermore, in so doing, the communication bandwidth of such systems is reduced significantly.

Finally, imaging in semiconductor manufacturing is limited by the need to step and repeat the exposure of a lithographic image. Alignment errors, though small, accumulate with increasing wafer size. The result is an inability of reliably making connections from one portion of a wafer to another if the sections being connected are located remotely from each other.

Ideally, what is needed is a way of allowing elements of a circuit to be placed at almost arbitrary distances from each other without suffering the adverse propagation delay effects, and without the limitations of the reticles used in current lithography. What is needed is a way to eliminate the need to place memory next to the CPU without suffering latency effects. What is needed is a way of connecting system components together using a system-on-a-chip concept and that does not adversely affect the system bandwidth. What is needed is a way of enabling inter-chip data transfer rates that significantly exceed current capabilities.

What is needed is a means for reducing the latency so that it is not a significant factor in limiting data transfer.

SUMMARY OF THE INVENTION

The present invention is an apparatus that allows bundles of optical fibers to be connected from one portion of a wafer to another. The result is a dramatic increase in the inter-system bus bandwidth, an increase in overall speed, and an ability to design systems on a wafer with the system elements positioned remote from each other with loss of speed or bandwidth. The invention further comprises a method for assembling optoelectronic interconnects in a system on a wafer.

One embodiment of the present invention encompasses flip-chip mounting of transceiver arrays to a CMOS substrate to enable communication of data from a CPU to memory cells located elsewhere on the chip. The invention exploits optoelectronic techniques to ensure high-speed data transfer with a significant increase in bandwidth over the currently practiced art. The invention further includes a method for fabricating the structure.

One example of the present invention is an apparatus that uses a silicon semiconductor wafer in which sub assemblies are constructed, wherein some of the sub assemblies contain separate areas containing CMOS circuitry to facilitate communication protocol. Transceiver arrays are aligned above the CMOS circuitry, and secured in place using hybrid chip technology known in the art. The transceiver arrays on a III–V substrate are connected electrically using ultra-high-density flip-chip integration, and are mechanically affixed using epoxy. More epoxy is then used to form standoffs positioned above the transceiver arrays, and fiber bundles are aligned with the standoffs, and then connected from one area of the wafer to the other.

Optionally, a face-plate or micro-lens array is included between the epoxy standoffs and the fiber bundle. This process is repeated among all desired sub systems. The fiber bundles then provide a communication pathway between the transceiver arrays from sub-system to sub-system. As a result, communications between disparate portions of a chip are permitted. Since communication between the transceiver arrays is done optically, the delays normally associated with electrical communication between disparate areas on a chip are eliminated. Furthermore, the optical transceiver arrays enable significantly broader bandwidth communication than was heretofore possible.

One object of the present invention is to provide an apparatus that results from these elements that enable the functionality of optical communication among subsystems in a system on a wafer. Another object of this invention is that the method and apparatus described in this invention scale to wafers of arbitrary size and that may encompass varied accompanying subsystems.

One other object of this invention is a process for assembling optical interconnections in a system on a wafer that comprises the steps of forming CMOS circuitry in the silicon substrate to facilitate communication protocol, positioning transceiver arrays above the CMOS circuitry and securing them in place using ball grid solder for electrical contacts and epoxy to ensure mechanical connections, then mounting epoxy standoffs on the transceiver arrays, then aligning one end of a fiber bundle with the transceiver arrays, and securing it in place using epoxy, and securing the other end of the fiber bundle with more epoxy in another epoxy standoff located in another area of CMOS circuitry elsewhere on the wafer.

Another object of the invention is the use of digital signal processing (DSP) chips, or other arithmetic co-processor devices. These chips are specialized data processors that enable very high processing speeds using a limited number of operations. However, to take full advantage of the capabilities of these chips, they must be placed close to the CPU. Using this invention, they can be placed at a considerable distance from the CPU, yet still function at peak performance without the ill effects of excessive latency. This process of connecting the functionality of different portions of a wafer-sized chip is a process of seamless integration.

And another object of this invention is the interconnection of optical transceivers on different portions of a wafer. Another object is the dramatic increase in the chip-to-chip bandwidth within a system on a wafer module.

Yet another object of this invention is the functionality of using optoelectronic interconnects to communicate between portions of a system on a wafer. Another object of the invention is the optical interconnection means contains optical transceivers for communicating between portions of a system on a wafer.

An additional object of this invention is to provide the huge increase in speed/data transfer rates and bandwidth afforded by having data flow optically between key areas in a system on a wafer. Another object of this invention is that, at least for modest sized arrays, the power requirements be not excessive, especially given the huge increase in speed and bandwidth.

A further object is that the limitation of reticle size constraints are overcome, and it be possible to connect distant regions or portions of a wafer via optical interconnects. Another object of this invention is the seamless integration of integrated circuits, such as digital signal processing chips, memory caches, etc. into complete systems on a wafer.

And a further object of the invention is to provide the flexibility to accommodate various network architectures by bundling the optic fibers and routing them to various nodes. Yet another object of the invention is to provide fiber bundle connectors for connecting to a backup chip of the wafer for redundancy. Such backup chips would not necessarily be in use, but could be activated if necessary. Such a design ensures flexibility even when using rigid optical connectors in wafer sized systems, and ensures redundancy of the functionality of the overall system.

An object of the invention is the interconnection of a CPU with memory cells using flip-chip optoelectronic interconnects, where the CPU contains CMOS circuitry to interface with the transceiver arrays, the memory cells also contain CMOS circuitry to interface with the transceiver arrays, and fiber optic cables or bundles connect the transceiver arrays at the CPU to those on the memory cells.

Another object of this invention is the process of sending data between a CPU and a memory device located on the same chip but at some distance from the CPU section itself, where the process consists of sending data in a CPU to data ports made of CMOS circuitry, which then couple the data to the transceivers, which in turn send the data over fiber optic bundles to transceivers located on data ports made of CMOS circuitry in the memory devices, and this circuitry finally sends the data to the memory location desired.

And still another object of this invention is to provide the function of communicating between a CPU and memory devices on the same chip using optical interconnect devices, i.e., transceivers and fiber optic bundles to couple data to and from a CPU and memory devices on the same chip. A further object this invention is the process of communicating between a CPU and memory devices on the same chip using transceivers and fiber optic bundles, where the fiber optic bundles interface with the bulk of the chip (memory or CPU) via local data processing circuitry.

Yet another object of this invention is the reduction of supplemental logic circuitry to manage data flow. Associated with this advantage are fewer layers of memory (and associated circuitry) and the memory management schemes that are required to pass data from on-chip memory caches to disk memory. Another object is the ability to access memory a page at a time by transferring a group of bits read from memory over parallel optical channels simultaneously.

An additional object of the invention is the functionality of swapping out the entire cache memory in one clock cycle, using parallel optical channels to transfer the data simultaneously. Another object of this invention is the elimination of problems associated with the pitch of transceivers by designing data management circuitry and optically connecting the subsystems. The pitch of the currently available transceivers imposes an increase in chip size, which in turn means that the number of chips per wafer is reduced.

Yet an additional object of this invention is a structure for communicating data between a processing unit of a chip and memory via flip-chip optical interconnects. The structure consists of a silicon substrate with processing circuitry, one or more flip-chip mounted transceiver arrays, CMOS circuitry that drive the transceivers, electrical interconnects that connect the CMOS circuitry and the processing circuitry. There are also one or more memory devices to which are flip-chip mounted other transceiver arrays that are controlled by separate CMOS circuitry. Finally, an optical bundle is connected between the transceiver arrays on the processor and the transceiver(s) on the memory structure(s).

Another object of this invention is the function of operating a processor using data accessed from memory using optoelectronic means. An object of this invention is that the structure and process described scale to chips of arbitrary size.

Another object of this invention is the process for assembling the structure, where the process consists of processing the CPU and memory portion of the circuit and separately the transceiver arrays, then flip-chip mounting the transceiver arrays onto the CPU, and then connecting the optical fibers between the CPU and the memory devices.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

Still other objects and advantages of the present invention will become readily apparent to those skilled in this art from the drawings and from a detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention.

DESCRIPTION OF THE PREFERRED EMBODIMENT

To those skilled in the art, the invention admits of many variations. The following is a description of a preferred embodiment, offered as illustrative of the invention but not restrictive of the scope of the invention. This invention involves a method and apparatus for transferring data within the nodes of a communication system. The invention is for a dramatically increased capability for transmitting and receiving data within a network. These novel aspects of the present invention will be discussed in terms of several scenarios that demonstrate various embodiments of the invention.

Figure 1:
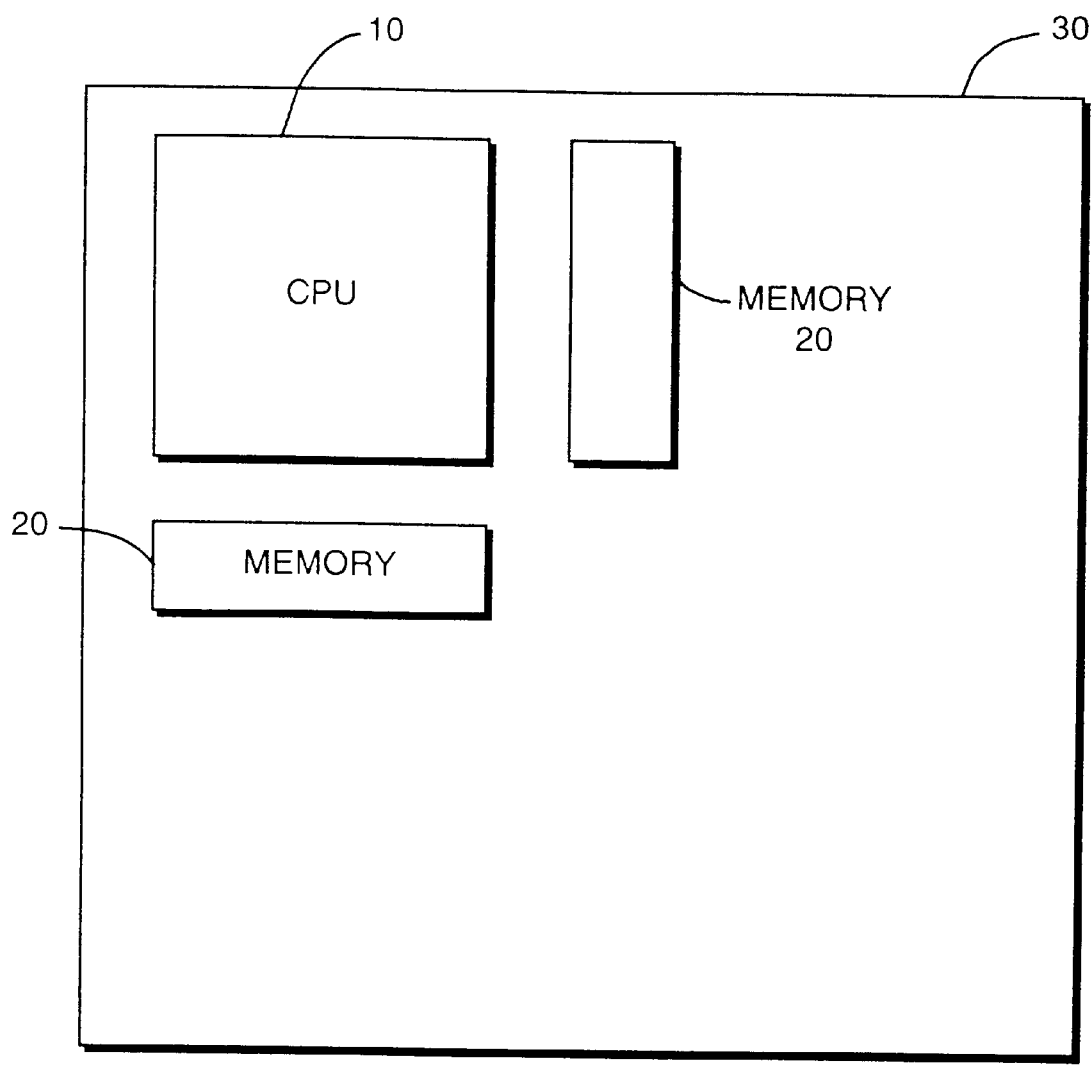
FIG. 1 is a prior art depiction of memory location in relation to CPU showing the proximal relationship of memory chips to the CPU
Figure 2A:
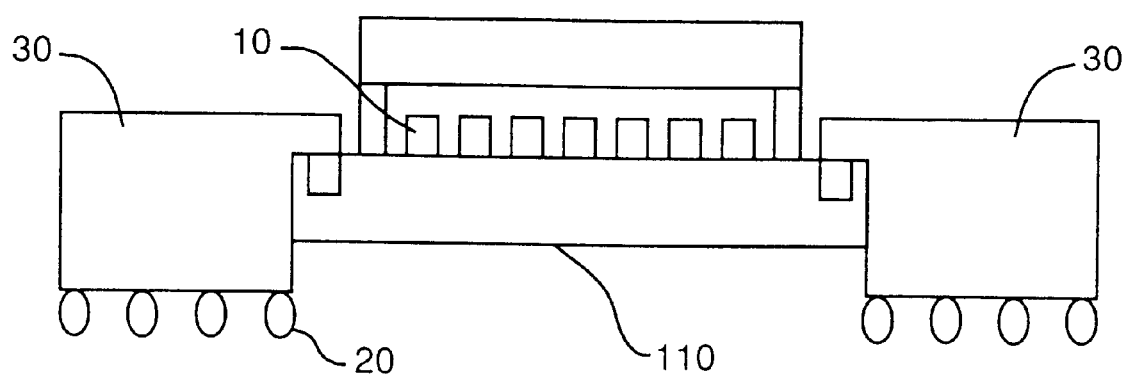
FIG. 2A is a side view of a prior art rigid electrical connector interface with transceivers, demonstrating the electrical connection to the electronic circuitry
Figure 2B:
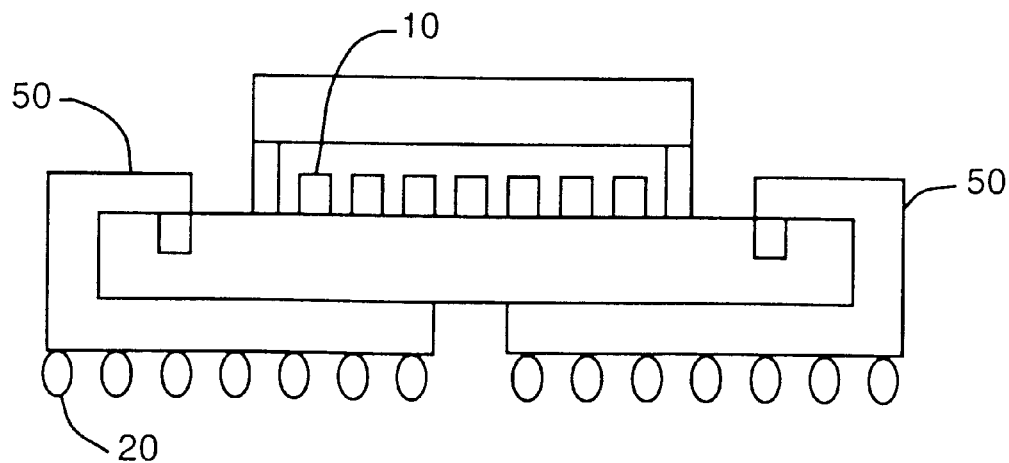
FIG. 2B is a side view of a prior art flexible electrical connector interface with transceivers, demonstrating the electrical connection to the electronic circuitry

The prior art attempts at optical interconnects are demonstrated in FIGS. 2A and 2B. FIG. 2A illustrates a rigid electrical interconnect that mates the optical emitters and detectors (transceivers) 10 connected to a device or IC die by a pair of rigid connectors 30 that employ solder bumps 20. A slightly different version for a flexible connector is shown in FIG. 2B, where a pair of flexible connectors 50 retain the transceiver array 10. These prior art systems are inadequate and inefficient for inter-chip communications.

Figure 3A:
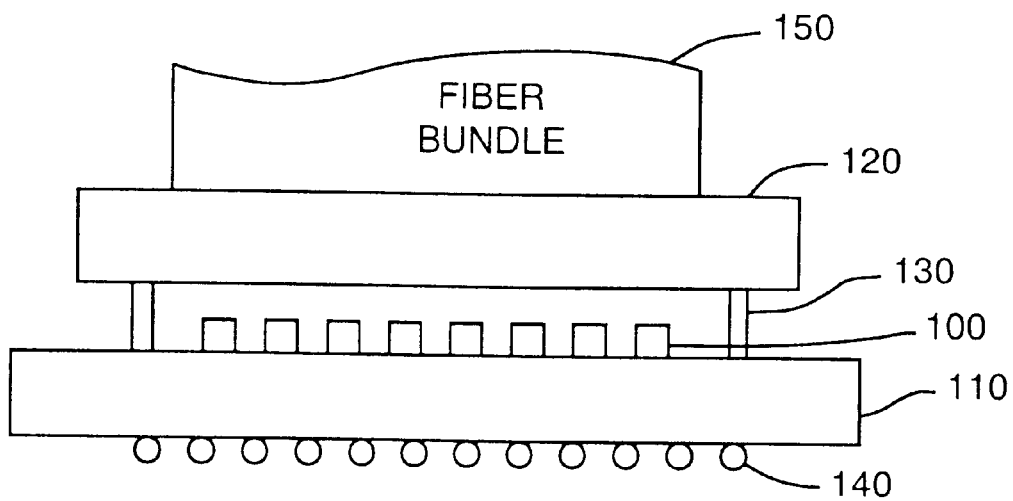
FIG. 3A is a cross-sectional view of optical interface with transceivers to depict the various elements comprising the interconnect structure from the electrical connection via the solder balls to the optical interconnect with the fiber bundle
Figure 3B:
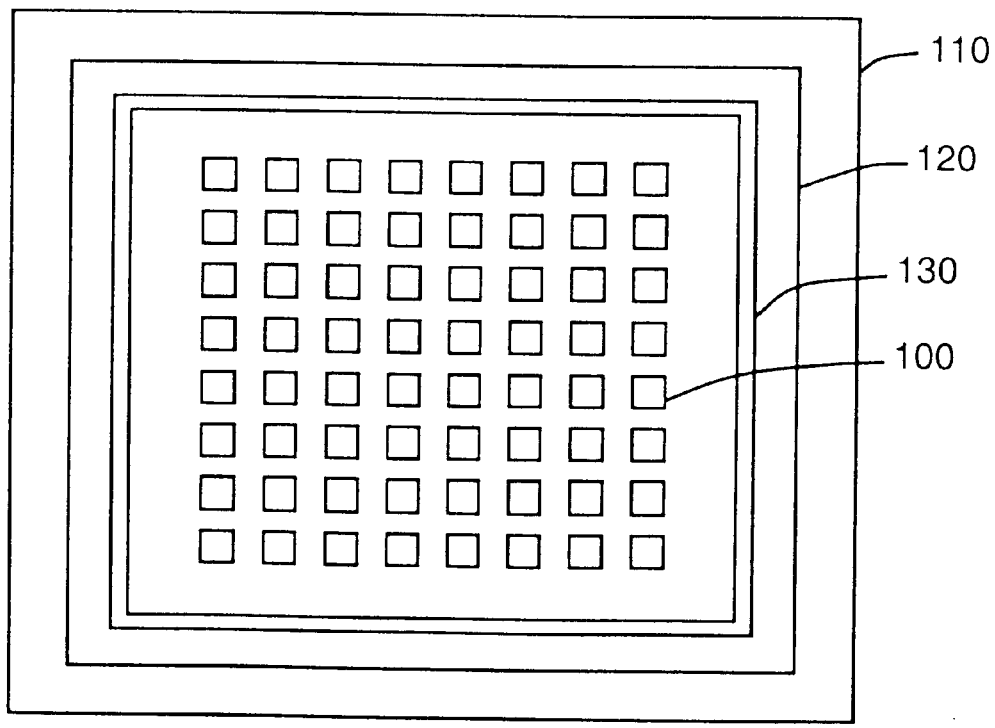
FIG. 3B is a top view of optical interface with transceivers showing the orientation of the transceiver array in relation to the face-plate and CMOS substrate

In FIGS. 3A and 3B, a high bandwith optical interface is shown, wherein subsystem portions of a system on a wafer are constructed with CMOS circuitry to facilitate a communication protocol. A transceiver array 100 containing a plurality of emitters and detectors are aligned above the CMOS substrate 110, and secured in place using hybrid chip technology known in the art. The transceiver arrays 100 on a III–V substrate 110 are connected electrically using ultra-high-density flip-chip integration, and are mechanically affixed using epoxy. More epoxy is then used to form standoffs 130 positioned above the transceiver arrays 100.

The assembly of the components begins with mounting emitter-detector transceiver arrays 100 on a CMOS substrate 110 as a means of converting electrical signals into optical signals. Transceiver arrays 100 are mounted on the data ports of the CPU (the locations on the chip where the data leaves the chip), and on the data ports of each of the memory cells on the CPU chip. The data ports contain bond pads on which the solder balls 140 of the transceiver arrays must be aligned. Thus, instead of having traditional metal interconnects coupling the CPU with the memory cells, there is CMOS circuitry in the CPU proper and in each memory cell to which the transceiver arrays are flip-chip mounted. Once having flip-chip mounted the arrays, optical fiber bundles connect the CPU and the memory cells. Note that the transceiver-to-transceiver distance is highly compressed in this figure.

In operation, the one embodiment for a process for assembling a structure for communicating between a processor and one or more memory devices comprises the steps of: (1) forming a silicon substrate with CMOS circuitry and processor means, (2) forming an emitter-detector transceiver array, (3) flip-chip mounting the transceiver array on top of the CMOS circuitry such that the solder balls on the transceiver array align with the corresponding bond pads on the CMOS circuitry, (4) forming a memory device that contains CMOS circuitry, (5) forming another transceiver array, and (6) flip-chip mounting the other transceiver array onto the CMOS circuitry of the memory device, and finally, (7) attaching a fiber optic bundle from one transceiver array to the other.

In one embodiment, fiber bundles 150 can be directly aligned with the standoffs 130, and then connected from one area to the other on the chip. Optionally, a face-plate 120 or micro-lens array is included between the epoxy standoffs 130 and the fiber bundle 150. This process is repeated among all desired sub systems. The fiber bundles 150 then provide a communication pathway between the transceiver arrays 100 from sub-system to sub-system. As a result, communications between disparate or non-adjacent portions of a chip are possible. Since communication between the transceiver arrays is done optically, the delays normally associated with electrical communication between disparate areas on a chip are eliminated. Furthermore, the optical transceiver arrays enable significantly broader bandwidth communication than was heretofore possible.

Figure 4:
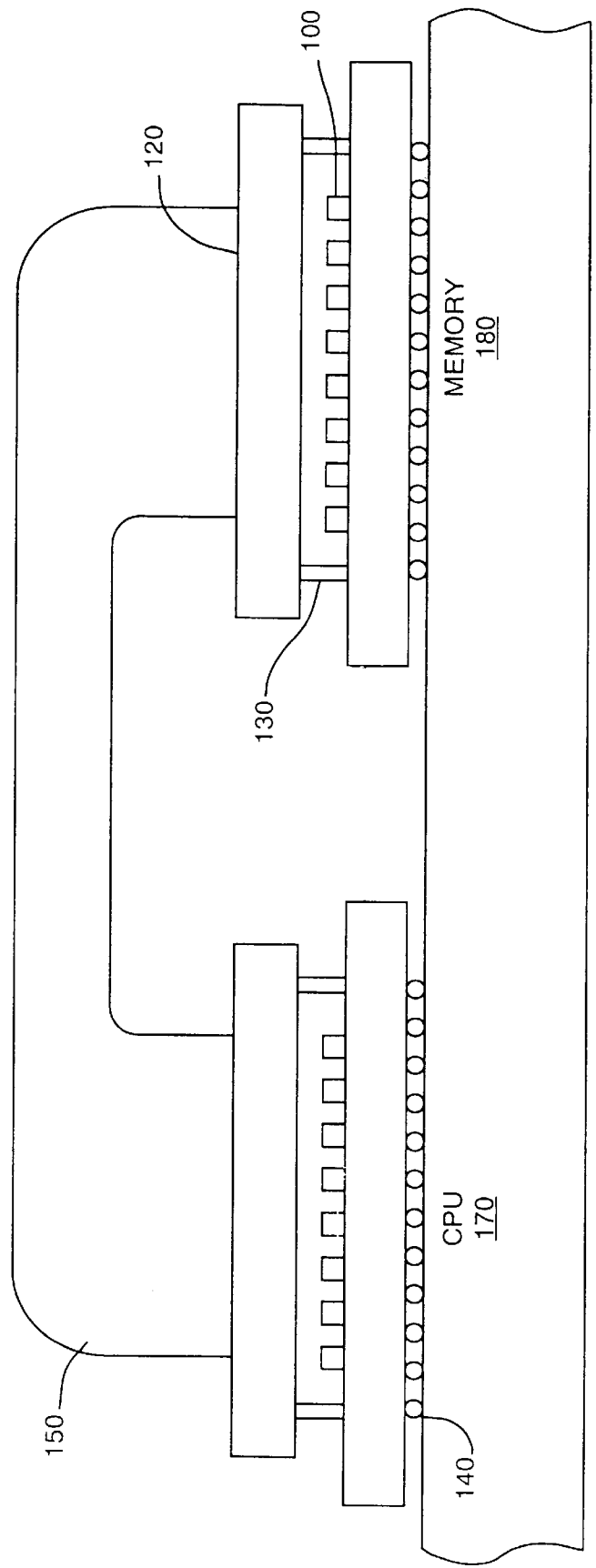
FIG. 4 is a cross section view of inter-chip connection of subsystems illustrating the fiber bundle connecting the respective transceiver arrays

FIG. 4 shows an inter-chip optical connection to be used to connect chips within a single CMOS substrate. As referenced herein, the term "chips" is used to denote different functionality of subsystems that comprise the overall system that resides on a wafer. The fiber bundle 150 connects from a faceplate 120 of one transceiver array 100 to a faceplate of another transceiver array.

Figure 7:
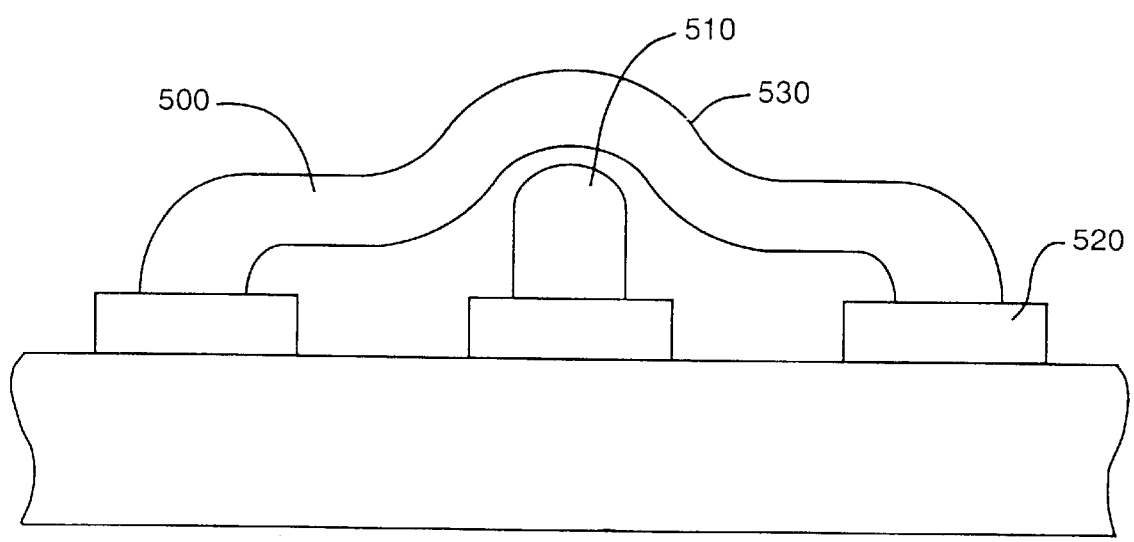
FIG. 7 is a side view of cross-over of a first fiber bundles connecting subsystems over a second fiber bundle connecting subsystems on a wafer

The connectors are preferably made of rigid fiber bundles. Alternatively, flexible bundles of fibers can be used to connect the transceiver arrays. The advantage of flexible bundles is that they accommodate a wider range of paths than do the rigid ones, as shown in FIG. 7. This feature can be beneficial in cases where there is a defect in a chip, and a redundant section of the chip must be used.

The result of using fiber bundles, either rigid or flexible, is that the number of bits per bus can be increased from 32 or 64 to thousands. Thus, there is a huge increase in bandwidth. In addition, there can be a corresponding huge reduction in the latency of data transfer because we can trade off newly realized excess bandwidth for latency. This increase presents an extraordinary increase in performance potential for systems on a wafer. For example, using technology currently available, designers must place memory caches close to the CPU so that the data can be accessed quickly and without dispersion effects that can degrade data transfer. Using the present invention, the memory cache can be placed well away from the CPU, yet be as accessible as if it were immediately adjacent to the CPU. Furthermore, since there is more space available, far more memory can be used as a memory cache.

Figure 5:
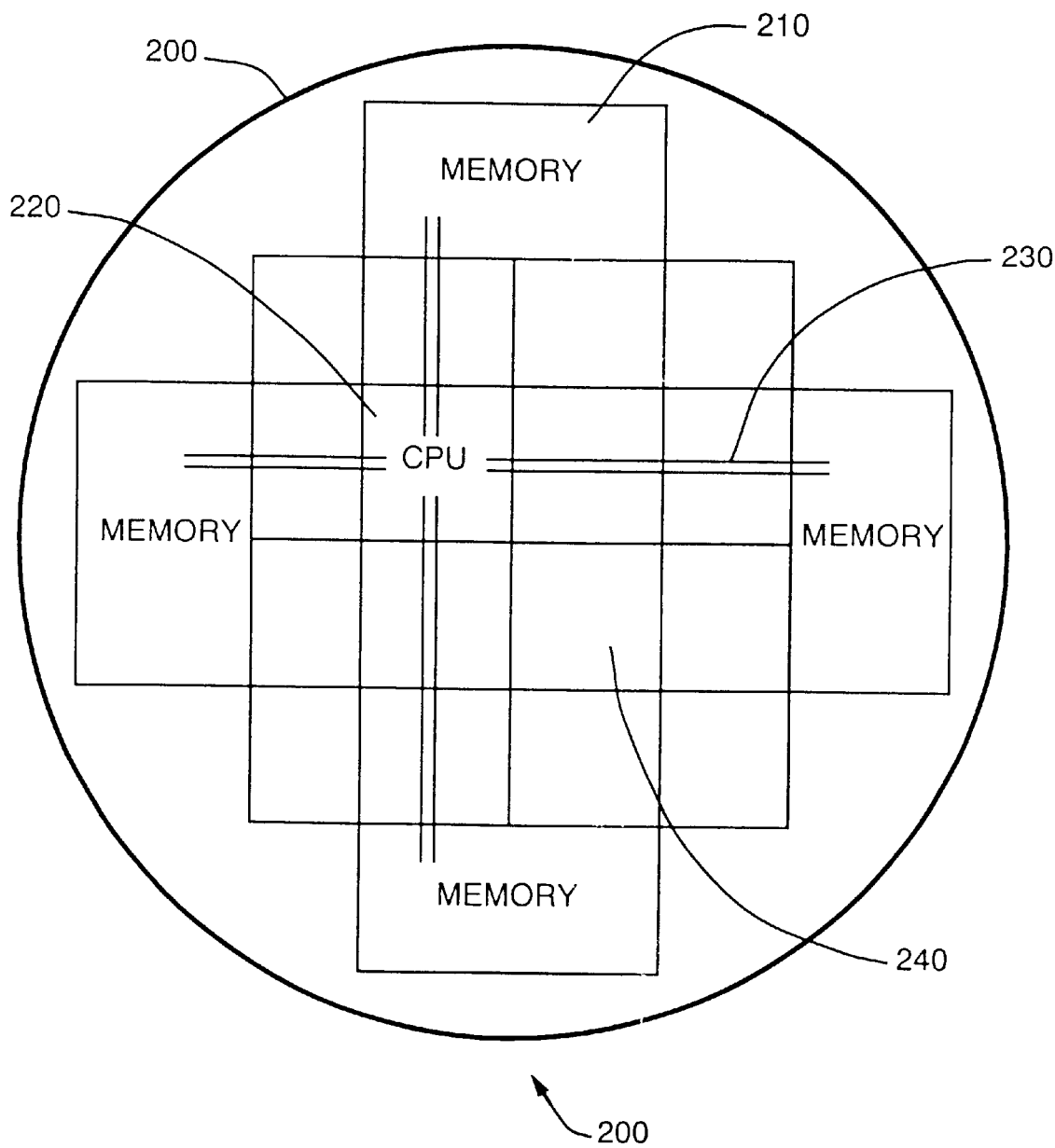
FIG. 5 is a top view depiction of inter-chip optical interconnects between memory and CPU on a wafer

Referring to FIG. 5, a wafer 200 is shown with various connections. The CPU 220 connects to four memory chips 210 via optical interconnects 230. The present invention establishes a direct correlation between the emitters and detectors and the mating optic fibers such that the fiber bundle may be subdivided to provide communication between certain portion of the transceiver array of the CPU and certain memory chips or other chips on the wafer. The combination of the fabrication of the transceiver array on the CMOS substrate and the optic fiber connector methodology of establishing a correlation between the emitters and receivers and the optic fibers provides a wide array of options.

In one embodiment a first CPU can communicate with one or more CPU's. The CPU subdivision may be helpful to alleviate substantial processing functionality. The CPU's may then communicate with memory chips in a second hand fashion.

The wafer 200 can be any size, but the benefits of the present invention increase with wafer size. There can be any number of subcircuits 240 encompassed on the wafer 200. The length of the optical interconnect is so small in relation to the speed of the optical data that this arrangement could be scaled to reasonably large wafer sizes without sacrificing bandwidth or functionality.

Figure 6:
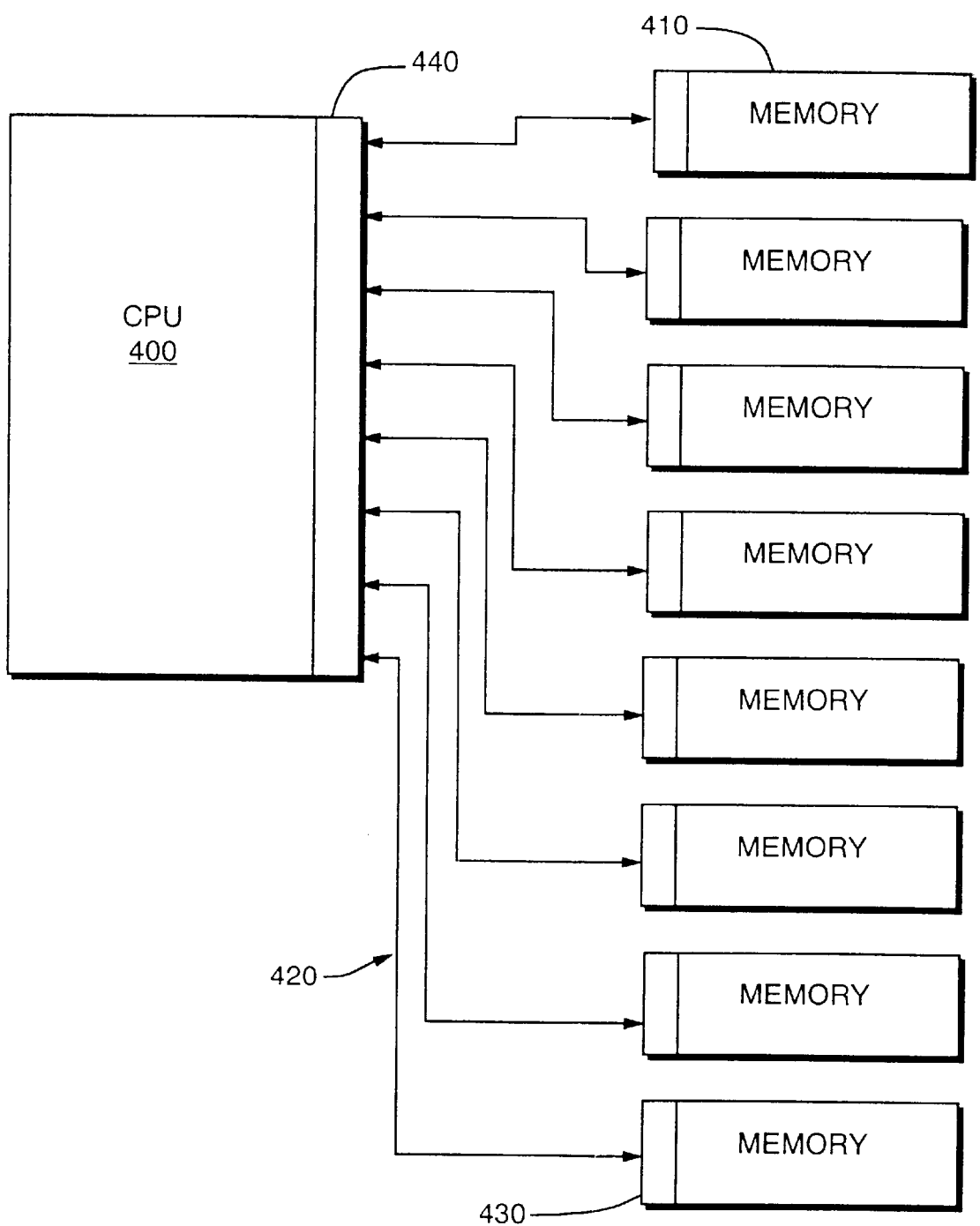
FIG. 6 is a diagrammatic illustration of CPU interconnected to remote memory chips by optical bundles

A representation of the inter-chip communication between the CPU and the memory chips is shown in FIG. 6. The CPU 400 is connected to eight memory chips 410 through the fiber optic bundles 420. The memory is located at some distance from the CPU without any ill affects from signal propagation latency.

Since the transceiver arrays can be considerably larger than the data bus structure they replace, there is an enormous increase in bandwidth. For instance, if the internal data bus is 128 bits, and the transceiver array is 1024 bits wide, there is a factor of 8 increase in bandwidth with equal clock rates. Furthermore, the transceivers are considerably faster in terms of latency, and in terms of symbol transmission rate. Thus, emitted data is coupled between the CPU and memory cells at a much faster rate as well as with a wider bandwidth.

The bus size can be increased, and at present, the primary limitation is the current requirement of having a pitch between transceivers of 128 $\mu$m. If the arrays are arranged with transceivers that are 4 deep, then the current technology means that the size of a 1024 bit bus to 33 mm. 4096 bits stacked 8 deep need an area 8×128 $\mu$m ×4096/8×128 $\mu$m, or 1.024 mm×65.536 mm. Thus, the use of this invention requires an increase in the size of chips. However, current CPUs are already as large as 20 mm on a side (before die shrink techniques reduce the chip footprint). Thus, to exploit the present invention, larger chips may be necessary for the optical interconnects.

However, since one of the benefits of the present invention is the ability to locate memory cells at a greater distance from the CPU, there is no intrinsic problem. In fact, with the present invention, there is a significant increase in processor speed. There is such an increase in processor speed that a penalty of needing a larger footprint is acceptable. In the future, as advances in technology allow the present limitation of 128 $\mu$m pitch between transceiver elements to be reduced, the corresponding chip size can also be reduced.

Another variation within the scope of the invention is when the real estate on the memory chips is merged with the real estate required by the transceiver arrays. Thus, the CPU can access the memory contents essentially directly.

Connections from one portion to another on the chip can be linear or they can follow any convenient path. By suitable bending of the bundle, as shown in FIG. 7, the connections between two or more sites can be on a data conduit that physically goes over another bundle.

Similarly, yet another embodiment is the direct connection, using the same optoelectronic transceiver arrays, to couple a CPU with other memory devices located off the circuit board, including disc drives. Thus, a tremendous amount of memory could appear from the CPU's perspective to be immediately adjacent to the CPU. Such memory may be on a hard disk controller, a network interface device, or other high bandwidth internal peripherals such as a video graphics board.

In a preferred embodiment the connectors are preferably made of rigid fiber bundles. Such bundles are preferred because they are commercially available (from Schott Glass Corp., for example). Alternatively, flexible bundles of fibers can be used to connect the transceiver arrays. The advantage of flexible bundles is that they accommodate a wider range of paths than do the rigid ones. This feature can be beneficial in cases where there is a defect in a chip, and a redundant section of the chip must be used. Regardless of whether flexible or rigid bundles are used, the benefit of all such bundles is that they can be formed in such a way that images can be magnified. This feature is beneficial because it allows greater flexibility in alignment tolerances, especially for aligning faceplates.

The result of using fiber bundles, either rigid or flexible, is that the number of bits per bus can be increased from 32 or 64 to thousands. Thus, there is a huge increase in bandwidth. In addition, there can be a corresponding huge reduction in the latency of data transfer because the excess bandwidth can be used as a trade off for latency. This increase presents an extraordinary increase in performance for wafer integrated systems. For example, using technology currently available, designers must place memory caches close to the CPU so that the data can be accessed quickly and without dispersion effects that can degrade data transfer. Using the present invention, the memory cache can be placed well away from the CPU, yet be as accessible as if it were immediately adjacent to the CPU because of the fiber optical inter-chip connection. Furthermore, since there is more space available, far more memory can be used as a memory cache.

Another application involves the use of digital signal processing (DSP) or other arithmetic coprocessor chips. These chips are specialized data processors that enable very high processing speeds using a limited number of operations. However, to take full advantage of the capabilities of these chips, they must be placed close to the CPU. Using this invention, they can be placed at a considerable distance from the CPU, yet still function at peak performance without the ill effects of excessive latency. This process of connecting the functionality of different portions of a wafer-sized chip is a process of seamless integration.

The invention is susceptible of many variations. For example, there is within the scope of the invention, a semiconductor microprocessor system on a single wafer silicon substrate, where the microprocessor system layout is divided on the substrate into at least two subsystems, each of the subsystems being overlaid with and electrically connected for data transfer to a respective semiconductor photo-transceiver array. The photo-transceiver arrays are optically interconnected for data transfer. The substrate contains the necessary CMOS circuitry for each subsystem and its respective photo-transceiver array. The CMOS circuitry incorporates communications protocol for enabling the data transfer.

In other variations of the invention, there is a semiconductor microprocessor system where the CPU subsystem is optically interconnected for data transfer to a Memory unit subsystem, or to a Digital Signal Processing unit subsystem or other co-processor or backup chip. The optical interconnect may be a fiber optic bundle connecting the respective photo-transceiver arrays of the various subsystems.

As another example of the invention, there is a semiconductor microprocessor system divided into at least two subsystems, each subsystem on a respective silicon substrate, each subsystem being overlaid with and electrically connected for data transfer to a respective semiconductor photo-transceiver array, each respective photo-transceiver array being optically interconnected for data transfer with the photo-transceivers of the other subsystems. Each substrate contains CMOS circuitry for its respective subsystems and photo-transceiver arrays, where the CMOS circuitry incorporates suitable communications protocol for enabling data transfer between the subsystems and/or external devices.

As in the single wafer embodiments, variations of the invention using more than one silicon substrate or wafer may place the CPU subsystem and one or more Memory units or co-processors or other subsystems on separate substrates, interconnected by optical means for data transfer.

As yet another example, there is within the scope of the invention a method for connecting the subsystems of a microprocessor system on a single wafer silicon substrate consisting of the steps of dividing a single wafer layout for a microprocessor system into at least two subsystems, providing for data transfer channels between the subsystems in the layout with electrical contacts in each subsystem for connecting data transfer channels to respective semiconductor photo-transceiver arrays, incorporating communications protocol in the CMOS circuitry in each subsystem layout for data transfer between the subsystems, fabricating the single wafer substrate with the CMOS circuitry for each said subsystem, aligning, attaching and electrically connecting a photo-transceiver array to each subsection, and optically interconnecting the respective photo-transceiver arrays for data transfer between the subsystems.

As in other variations, the methodology applies to a microprocessor system on a single wafer silicon substrate where the subsystems include a CPU interconnected to a Memory Unit, a coprocessor device, or other subsystem of a microprocessor system. And the means for interconnecting the photo-arrays may be a fiber optic bundle, whether rigid or flexible, whether short or long.

Still yet another example of the invention is a method for connecting the subsystems of a microprocessor system where the subsystems are divided among at least two silicon substrates, the method including the steps of dividing the subsystem layouts of a master layout for a microprocessor system for fabrication on the two or more silicon substrates, providing electrical contacts in the subsystem layouts for semiconductor photo-transceiver arrays for data transfer channels between the substrates, incorporating communications protocol in CMOS circuitry in each subsystem layout for data transfer between the substrates, fabricating the substrates with the CMOS circuitry for each subsystem, aligning, attaching and electrically connecting a photo-transceiver array to each substrate, and optically interconnecting the respective photo-transceiver arrays for data transfer between the subsystems and/or external devices.

As in other variants, the subsystems may include a CPU interconnected with a Memory Unit, a co-processor, and/or other subsystems appropriate or necessary to the microprocessor system, and the interconnect may be a fiber optic bundle, whether rigid or flexible, whether short or long, connecting the respective photo-transceiver arrays.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A semiconductor microprocessor system on a single wafer silicon substrate, comprising:
   said microprocessor system divided on said substrate into at least two subsystems, each said subsystems being overlaid with and electrically connected for data transfer to a respective semiconductor photo-transceiver array, said respective photo-transceiver arrays being optically interconnected for said data transfer, said substrate containing CMOS circuitry for each said subsystem and respective photo-transceiver array, said CMOS circuitry incorporating communications protocol for enabling said data transfer.

2. A semiconductor microprocessor system according to claim 1, one said subsystem being a CPU, another said subsystem being a Memory unit.

3. A semiconductor microprocessor system according to claim 1, one said subsystem being a CPU, another said subsystem being a Digital Signal Processing unit.

4. A semiconductor microprocessor system according to claim 1, said being optically interconnected comprising a fiber optic bundle connecting said respective photo-transceiver arrays.

5. A semiconductor microprocessor system according to claim 1, one said subsystem being a CPU, another said subsystem being a backup chip.

6. A semiconductor microprocessor system comprising; said microprocessor system divided into at least two subsystems, each said subsystem on a respective silicon substrate, each said subsystem being overlaid with and electrically connected for data transfer to respective semiconductor photo-transceiver arrays, said respective photo-transceiver arrays being optically interconnected for said data transfer, each said substrate containing CMOS circuitry for its respective said subsystem and respective said photo-transceiver array, said CMOS circuitry incorporating suitable communications protocol for enabling said data transfer.

7. A semiconductor microprocessor system according to claim 6, one said subsystem being a CPU, another said subsystem being a Memory unit.

8. A semiconductor microprocessor system according to claim 6, one said subsystem being a CPU, another said subsystem being a co-processor device.

9. A method for interconnecting subsystems of a microprocessor system on a single wafer silicon substrate comprising the steps:
   (a) dividing a single wafer layout for said microprocessor system into at least two said subsystems,
   (b) providing for data transfer channels between said subsystems in said layout with electrical contacts in each said subsystem for connecting said data transfer channels to respective semiconductor photo-transceiver arrays,
(c) incorporating communications protocol in CMOS circuitry in each said subsystem layout for data transfer between said subsystems,
(d) fabricating said single wafer substrate with said CMOS circuitry for each said subsystem,
(e) aligning, attaching and electrically connecting said photo-transceiver array to each said subsection,
(f) optically interconnecting respective said photo-transceiver arrays for said data transfer.

10. A method for interconnecting the subsystems of a microprocessor system on a single wafer silicon substrate according to claim 9, said at least two subsystems being a CPU and a Memory Unit.

11. A method for interconnecting the subsystems of a microprocessor system on a single wafer silicon substrate according to claim 9, one said subsystem being a CPU, another said subsystem being a coprocessor device.

12. A method for interconnecting the subsystems of a microprocessor system on a single wafer silicon substrate according to claim 9, said optically interconnecting comprising installing a fiber optic bundle connecting said respective photo-transceiver arrays.

13. A method for interconnecting the subsystems of a microprocessor system on a single wafer silicon substrate according to claim 12, said fiber optic bundle being rigid.

14. A method for interconnecting the subsystems of a microprocessor system on a single wafer silicon substrate according to claim 12, said fiber optic bundle being flexible.

15. A method for interconnecting the subsystems of a microprocessor system where said subsystems are divided among at least two silicon substrates, comprising the steps:
(a) dividing the subsystem layouts of a master layout for a said microprocessor system for fabrication on said at least two silicon substrates,
(b) providing electrical contacts in said subsystem layouts for semiconductor phototransceiver arrays for data transfer channels between said substrates,
(c) incorporating communications protocol in CMOS circuitry in each said subsystem layout for data transfer between said substrates,
(d) fabricating said substrates with said CMOS circuitry for each said subsystem,
(e) aligning, attaching and electrically connecting a said photo-transceiver array to each said substrate, and
(f) optically interconnecting respective said photo-transceiver arrays for said data transfer.

16. A method for connecting the subsystems of a microprocessor system according to claim 15, said at least two subsystems being a CPU and a Memory Unit.

17. A method for connecting the subsystems of a microprocessor system according to claim 15, one said subsystem being a CPU, another said subsystem being a Digital Signal Processing unit or other arithmetic coprocessor device.

18. A method for connecting the subsystems of a microprocessor system according to claim 15, said optically interconnecting comprising installing a fiber optic bundle connecting said respective photo-transceiver arrays.

* * * * *

UNITED STATES PATENT AND TRADEMARK OFFICE
CERTIFICATE OF CORRECTION

PATENT NO.    : 6,567,963 B1
DATED         : May 20, 2003
INVENTOR(S)   : John A. Trezza It is certified that error appears in the above-identified patent and that said Letters Patent is hereby corrected as shown below:

Title page,
Item [56], References Cited, U.S. PATENT DOCUMENTS, insert the following:
-- 5,630,162    05/1997    Wilkinson et al.
   5,925,343    07/1999    Nash et al.
   6,147,366    11/2000    Drottar et al.
   6,160,653    12/2000    Davidson
   6,310,366    10/2001    Rhodes et al.
   6,339,503    01/2002    Derstine et al. --
Item [57], ABSTRACT,
Line 3, delete "or substrates", insert -- on a single supporting substrate --

Column 1,
Line 67, delete "only"

Column 5,
Line 63, delete "And still another object of this invention is to provide the function of communicating between a CPU and memory devices on the same chip using optical interconnect devices, i.e., transceivers and fiber optic bundles to couple data to and from a CPU and memory devices on the same chip."

Column 6,
Line 6, delete "Yet another object of this invention is the reduction of supplemental logic circuitry to manage data flow. Associated with this advantage are fewer layers of memory (and associated circuitry) and the memory management schemes that are required to pass data from on chip memory caches to disk memory."

Column 8,
Line 47, after "wafer.", insert -- In most instances a single wafer silicon substrate is a semiconductor microprocessor system that is divided into subsystems on the wafer. --
Line 62, delete "because we can trade", insert -- by trading --
Line 65, delete "For example,", insert (For example, --

Column 9,
Line 2, delete "transfer.", insert -- transfer.) --
Lines 48 and 51, (both occurrences), delete "128", insert -- 125 --

Column 10,
Lines 10-18, delete paragraph.

UNITED STATES PATENT AND TRADEMARK OFFICE
CERTIFICATE OF CORRECTION

PATENT NO. : 6,567,963 B1
DATED : May 20, 2003
INVENTOR(S) : John A. Trezza

It is certified that error appears in the above-identified patent and that said Letters Patent is hereby corrected as shown below:

Column 11,
Line 15, after "system", insert -- for coupling internally and externally. The system is --
Line 18, delete "substrate", insert -- chip on a common supporting substrate wafer --
Line 32, delete "substrates", insert -- chips on a common supporting substrate --
Line 59, delete "substrates,", insert -- die, wherein each die is a single silicon wafer on a common supporting substrate layer. --
Line 59, delete "the", insert -- The --
Line 59, after "method", insert -- for connecting the subsystems --
Lines 61, 64 and 66, delete "substrates", insert -- die --

Column 12,
Line1, delete "substrates", insert -- die --
Line 3, delete "substrate", insert -- die --
Line 45, after "subsystem", insert -- being mounted on a common supporting substrate wafer --

Column 14,
Line 3, delete "substrates", insert -- die mounted on a common supporting substrate wafer --
Lines 6, 9, 12 and 13, delete "substrates", insert -- die --
Line 16, delete "substrate", insert -- die --

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,567,963 B1  
DATED : May 20, 2003  
INVENTOR(S) : John A. Trezza

Page 1 of 1

It is certified that error appears in the above-identified patent and that said Letters Patent is hereby corrected as shown below:

Column 5,
Line 56, delete "chip", insert -- wafer or semiconductor substrate --.

Signed and Sealed this

Twenty-ninth Day of November, 2005

JON W. DUDAS
*Director of the United States Patent and Trademark Office*